(12) United States Patent
Kim (10) Patent No.: US 8,687,229 B2
(45) Date of Patent: Apr. 1, 2014

(54) IMAGE SCANNING APPARATUS AND METHOD WHICH CONTROLS TIME AND INTENSITY OF LIGHT EMITTING ELEMENTS

(75) Inventor: Kyung-rok Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 628 days.

(21) Appl. No.: 12/926,870

(22) Filed: Dec. 14, 2010

(65) Prior Publication Data

US 2011/0149306 A1 Jun. 23, 2011

(30) Foreign Application Priority Data

Dec. 21, 2009 (KR) .......................... 10-2009-0128337

(51) Int. Cl.
*H04N 1/00* (2006.01)
(52) U.S. Cl.
USPC .......................................................... 358/1.6
(58) Field of Classification Search
None
See application file for complete search history.

(56) References Cited

U.S. PATENT DOCUMENTS

| 5,712,674 A * | 1/1998 | Doi ............................... 347/238 |
| 6,753,986 B1 * | 6/2004 | Sato .............................. 358/505 |
| 7,551,327 B2 * | 6/2009 | Chang et al. .................. 358/471 |
| 2007/0145233 A1 * | 6/2007 | Kaihotsu ....................... 250/205 |
| 2008/0029687 A1 * | 2/2008 | Kaihotsu ....................... 250/206 |
| 2010/0157012 A1 * | 6/2010 | Huei et al. .................... 347/250 |

FOREIGN PATENT DOCUMENTS

KR  10-0818856  3/2008

* cited by examiner

*Primary Examiner* — Jeremiah Bryar
(74) *Attorney, Agent, or Firm* — Staas & Halsey LLP (57) ABSTRACT

An image scanning apparatus and method. The image scanning apparatus which scans an image of document includes a light source including at least three light emitting elements of red, green, and blue, which are sequentially lit up at intervals of a first time, a light emitting time control unit to control a light emitting time of the at least three light emitting elements such that the first time is shorter than a second time by a predetermined value, a sensor array to transform an image formed by light reflected from the document into an electric signal according to results of the control of the light emitting time and the light intensity, and an output unit to output image data corresponding to the transformed electric signal.

18 Claims, 8 Drawing Sheets

IMAGE SCANNING APPARATUS AND METHOD WHICH CONTROLS TIME AND INTENSITY OF LIGHT EMITTING ELEMENTS

CROSS-REFERENCE TO RELATED APPLICATION

This application claims the priority benefit of Korean Patent Application No. 10-2009-0128337, filed on Dec. 21, 2009, in the Korean Intellectual Property Office, the disclosure of which is incorporated herein in its entirety by reference.

BACKGROUND

1. Field

One or more embodiments relate to an image scanning apparatus and method, an image forming apparatus including the image scanning apparatus, an image forming apparatus to perform an image scanning method, and a non-transitory recording medium having recorded thereon a program for executing the image scanning method on a computer.

2. Description of the Related Art

An image scanning apparatus generally irradiates light onto document by using a light source and performs photoelectric transformation on reflected light of the irradiated light by using an image sensor, thereby generating image data. An example of the image sensor may be a contact image sensor (CIS), being closed to the document, which reads the document under a magnification of 1 time. The CIS includes a light source including light emitting elements having three light emitting wavelengths of Red, Green, and Blue, a light guide object which illuminates the document with the light emitted from the light source in a width direction of the document, and a sensor array which detects reflected light from the document. The sensor array has a length equal to the width (line) of the document.

SUMMARY

Embodiments provide an image scanning apparatus and method to improve the quality of a scanned image.

One or more embodiments provide a non-transitory recording medium having recorded thereon a program for executing the image scanning method on a computer.

According to an aspect of one or more embodiments, there is provided an image scanning apparatus which scans an image of document, the image scanning apparatus including a light source including at least three light emitting elements of red, green, and blue, which are sequentially lit up at intervals of a first time; a light emitting time control unit to control a light emitting time of the at least three light emitting elements such that the first time is shorter than a second time by a predetermined value, the second time being a value obtained by dividing, by 3, a predetermined time that is required to scan an image of a line of the document; a light intensity control unit to control a light intensity of the at least three light emitting elements such that an intensity of light irradiated from the at least three light emitting elements is increased according to the predetermined value; a sensor array to transform an image formed by light reflected from the document into an electric signal according to results of control of the light emitting time and the light intensity; and an output unit to output image data corresponding to the transformed electric signal.

According to another aspect of one or more embodiments, there is provided an image forming apparatus including an image scanning apparatus which controls a light emitting time of a plurality of light emitting elements such that the plurality of light emitting elements are sequentially lit up at intervals of a first time which is shorter by a predetermined value than a second time being a value obtained by dividing, by 3, a predetermined time that is required for scanning an image of any one of a plurality of lines of document, which controls an intensity of light irradiated from the plurality of light emitting elements such that the intensity of light irradiated from the plurality of light emitting elements is increased according to the predetermined value, which irradiates light onto the document by sequentially lighting up the plurality of light emitting elements at intervals of the first time according to results of controlling the light emitting time and the light intensity, which transforms an image formed by reflected light from the document, and which outputs an image data corresponding to the transformed electric signal; and an image forming unit which prints print data corresponding to the image data output from the image scanning apparatus onto a print sheet.

According to another aspect of one or more embodiments, there is provided an image scanning method which scans an image of document, the image scanning method includes controlling a light emitting time of a plurality of light emitting elements such that the plurality of light emitting elements are sequentially lit up at intervals of a first time which is shorter than a second time by a predetermined value, the second time being a value obtained by dividing, by 3, a predetermined time that is required for scanning an image of a line of the document; controlling a light intensity of the plurality of light emitting elements such that an intensity of light irradiated from the plurality of light emitting elements is increased according to the predetermined value; irradiating light onto the document by sequentially lighting up the plurality of light emitting elements at intervals of the first time according to results of controlling the light emitting time and the light intensity; transforming an image formed by light reflected from the document into an electric signal; and outputting image data corresponding to the transformed electric signal.

According to another aspect of one or more embodiments, there is provided at least one non-transitory computer-readable recording medium having recorded thereon computer readable program instructions for executing the image scanning method on one or more processors.

BRIEF DESCRIPTION OF THE DRAWINGS

The above aspects will become more apparent by describing in detail one or more embodiments with reference to the attached drawings in which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
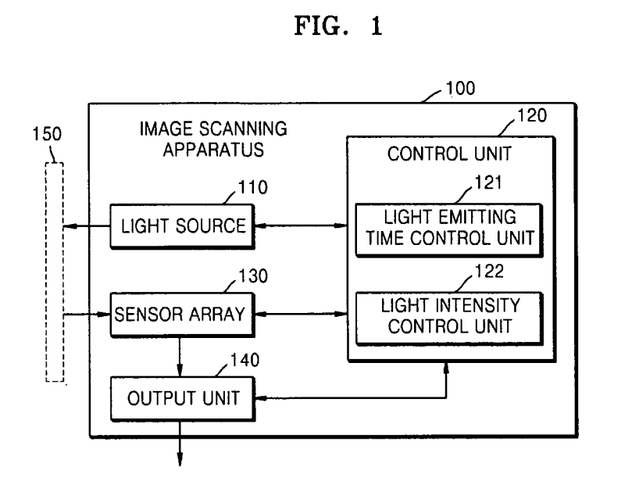
FIG. 1 is a block diagram of an image scanning apparatus according to an embodiment.

FIG. 1 is a block diagram of an image scanning apparatus 100 according to an embodiment. Referring to FIG. 1, the image scanning apparatus 100 includes a light source 110, a control unit 120, a sensor array 130, and an output unit 140, and the control unit 120 includes a light emitting time control unit 121 and a light intensity control unit 122.

The image scanning apparatus 100 shown in FIG. 1 includes components related to an embodiment. Therefore, it can be easily understood by those of ordinary skill in the art that general-purpose components other than the components shown in FIG. 1 may be further included in the image scanning apparatus 100.

The image scanning apparatus 100 scans a scan target 150. The scanning involves converting document corresponding to the scan target 150, such as a photo, or a picture, into image data. The converted image data is output through the output unit 140 of the image scanning apparatus 100. In the following description, the converted image data will be referred to as scan data for the sake of convenience.

The scan data may be displayed on a user interface unit (not shown) provided in the image scanning apparatus 100 through the output unit 140, or may be displayed in the form of an image on a host device, a general-purpose computer system; or a Personal Digital Assistant (PDA) connected through the output unit 140. The scan data may be used in facsimile transmission, copying, e-mail transmission, or server transmission.

In an embodiment, the output unit 140 may include a device which has a communication function and transmits data through a network. Therefore, in an embodiment, the output unit 140 may include a modem used in facsimile transmission/reception for transmitting and receiving data to/from an external device, a network module for connecting to a network, and a universal serial bus (USB) host module for forming a data transfer channel with a removable storage medium.

The image scanning apparatus 100 scans an image of the document which is the scan target 150, and outputs the scan data. To scan the image of the document, the light source 110 provided in the image scanning apparatus 100 irradiates light onto the document which is the scan target 150.

The light source 110 includes different light emitting elements of at least three colors including Red, Green, and Blue, which are sequentially lit up at intervals of the first time. The light emitting element may be, but not limited to, a light emitting diode (LED), an organic light emitting diode (OLED), or the like, and may be any light source element which irradiates light for scanning the scan target 150 and controls light intensity by using current or voltage.

That is, the light source 110 includes at least three light emitting elements having different light emitting wavelengths. Although it will be described that the light source 110 includes a first light emitting element, a second light emitting element, and a third light emitting element corresponding to three primary colors, red (R), green (G), and blue (B) for the sake of convenience, but the image scanning apparatus 100 according to an embodiment is not limited thereto.

The light emitting elements included in the light source 110 are sequentially lit up at intervals of the first time. That is, to scan an image of any one of a plurality of lines of the document, the light emitting elements included in the light source 110 are sequentially lit up at intervals of the first time. The line may correspond to, but not limited to, the width of the document.

In other words, if the first light emitting element, the second light emitting element, and the third light emitting element are included in the light source 110, a time period from the lighting-up point of time of the first light emitting element to the lighting-up point of time of the second light emitting element after the extinguishing of the first light emitting element is the first time. A time period from the lighting-up point of time of the second light emitting element to the lighting-up point of time of the third light emitting element after the extinguishing of the second light emitting element is also the first time.

The first light emitting element, the second light emitting element, and the third light emitting element included in the light source 110 do not emit light at the same time. That is, after a light emitting element is lit up, emits light for a predetermined time, and then is extinguished, another light emitting element is lit up. The light emitting elements included in the light source 110 are sequentially lit up. Accordingly, after a light emitting element is lit up and then extinguished, another light emitting element is lit up.

For example, if the first light emitting element, the second light emitting element, and the third light emitting element included in the light source 110 are arranged in a row, the first light emitting element is lit up and extinguished, and then the second light emitting element positioned adjacent to the first light emitting element is lit up and extinguished. After the second light emitting element is extinguished, the third light emitting element positioned adjacent to the second light emitting element is lit up and extinguished. In this way, to scan an image of a line, each of the plurality of light emitting elements included in the light source 110 is lit up and extinguished once.

However, in an embodiment, it may be appreciated that each of the plurality of light emitting elements included in the light source 110 may be lit up and extinguished at least two times during scanning of an image of a line, as will be described in detail below.

The control unit 120 controls the overall operation of the image scanning apparatus 100. The control unit 120 may further include a processor or a plurality of processors. It may be appreciated that the processor may be implemented with an array of a plurality of logic gates or with a combination of a general-purpose microprocessor and a memory having stored therein a program that may be executed in the microprocessor. Referring to FIG. 1, the control unit 120 includes a light emitting time control unit 121 and a light intensity control unit 122.

The light emitting time control unit 121 controls a light emitting time of the light source 110. That is, the light emitting time control unit 121 controls the light emitting time of the light source 110 such that the first time for which each of the plurality of light emitting elements included in the light source 110 is sequentially lit up is shorter than a second time by a predetermined value. The second time is the value obtained by dividing, by 3, a predetermined time that is required for scanning an image of a line. The value '3' is the number of light emitting elements having different light emitting wavelengths, which are included in the light source 110. In an embodiment, the second time may be defined as follows:

$$(SecondTime) = \frac{Paper1PageScantime}{LineNumber \times 3}, \quad (1)$$

where "Paper1PageScan time" represents a time required for scanning a page of document, "LineNumber" represents the number of scan lines in a sub-scanning direction for scanning a page of the document, and "3" refers to the number of light emitting elements having different light emitting wavelengths, which are included in the light source 110. In other words, the predetermined time required for scanning an image of a line is the value of "Paper1PageScan time" divided by "LineNumber".

For example, for an image scan speed of 40 imp (image per minute, which denotes the number of scan pages per minute), "Paper1PageScan time" may be 1.5 seconds and "LineNumber" may be a product of the scan-direction length of document and the sub-scan-direction resolution of a scan image.

When the image scanning apparatus 100 generally scans an image of any one of a plurality of lines of document, in an embodiment, the second time may denote a time period from the lighting-up point of time of any one of a plurality of light emitting elements to the lighting-up point of time of another light emitting element. In other words, when an image of document is scanned by a contact image sensor (CIS) module having the single-channel type of sensor array 130 attached thereto by using the light source 110 which is of a time-division multi-color (R_LED, G_LED, B_LED) type light source, the second time is the value obtained by dividing, by 3, an exposure time or integration time during which the CIS module performs light reception for scanning an image of a line of the document in order to implement a color image.

Figure 2:
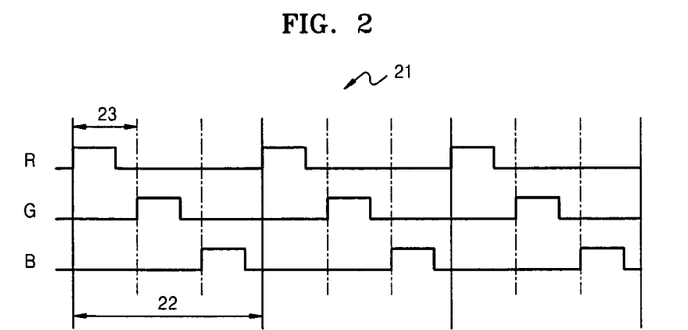
FIG. 2 is a timing diagram for defining a second time according to an embodiment.

FIG. 2 is a timing diagram for defining a second time according to an embodiment. Referring to FIG. 2, a timing diagram 21 shows the timing for the lighting-up and extinguishing of three light emitting elements. For example, in the timing diagram 21, a light emitting element may be lit up at a rising edge and may be extinguished at a falling edge. Also shown in FIG. 2 are a time 22 required for scanning an image of any one of a plurality of lines of document and a second time 23 corresponding to the time 22.

Referring back to FIG. 1, the light emitting time control unit 121 controls the light emitting time of the light emitting elements such that the first time during which each of the light emitting elements is sequentially lit up is shorter than the second time by a predetermined value. For example, the first time may be 1/N times the second time where N may be greater than 1. N may be a natural number, but may also be any number that can be implemented in the light emitting time control unit 121 without being limited to the natural number.

In other words, the light emitting time control unit 121 performs a control operation such that the light emitting elements included in the light source 110 are sequentially lit up at intervals of the first time. The first time may be defined as follows:

$$(FirstTime) = \frac{SecondTime}{N}, \quad (2)$$

where "SecondTime" represents "SecondTime" defined in Equation 1 and N represents a number greater than 1.

When N is a natural number, sequential lighting-up points of time of the first light emitting element, the second light emitting element, and the third light emitting element included in the light source 110 may be defined as follows:

$$(FirstLightEmittingElementLighting-UpMoment) = \quad (3)$$
$$(1LineImageScanTime) \times i$$

$$(SecondLightEmittingElementLighting-UpMoment) = \quad (4)$$
$$(1LineImageScanTime) \times \left(\frac{1}{3N} + i\right)$$

$$(ThirdLightEmittingElementLighting-UpMoment) = \quad (5)$$
$$(1LineImageScanTime) \times \left(\frac{2}{3N} + i\right)$$

In Equations 3-5, "1LineImageScanTime" represents a predetermined time required for scanning an image of a line, N represents a natural number greater than 1, and i represents a line of a plurality of lines of document, in which i is an integer greater than or equal to 0. That is, after scanning for one of a plurality of lines is completed, i increases by +1. Therefore, in the case of i=0 in Equations 3-5, results of Equations 3-5 mean points of time at which the light emitting elements are lit up to scan an image of a first line of the document.

The light emitting time control unit 121 may generate a sync signal for determining lighting-up and extinguishing points of time of the light emitting elements included in the light source 110, and control the light emitting times of the light emitting elements by using the generated sync signal.

In an embodiment, one of the light emitting elements is lit up at a falling edge of the sync signal and is extinguished at a rising edge of a newly generated sync signal. That is, in an embodiment, each of the light emitting elements of the light source 110 emits light during an inactive period of a sync signal.

The light emitting time control unit 121 may generate a sync signal at intervals of 1/N times the second time. In other words, the sync signal may be generated at intervals of the first time, and thus the light emitting elements included in the light source 110 may be sequentially lit up at intervals of the first time.

Figure 3:
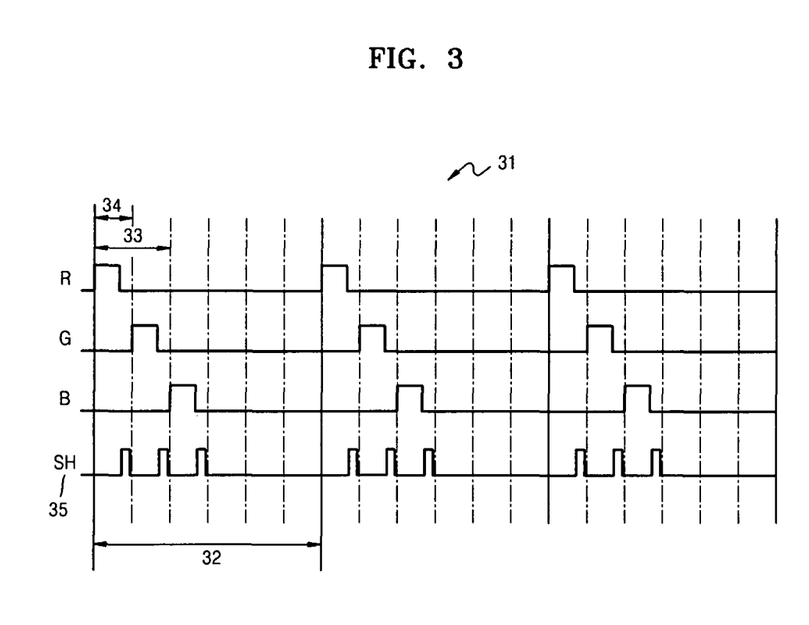
FIG. 3 is a timing diagram for defining a first time according to an embodiment.

FIG. 3 is a timing diagram for defining the first time according to an embodiment. FIG. 3 illustrates a timing diagram 31 showing lighting-up and extinguishing points of time of three light emitting elements for N=2 in Equation 2. Also shown in FIG. 3 are a time 32 required for scanning an image of one of a plurality of lines of document, a second time 33 corresponding to the time 32, and a first time 34 for N=2. A sync signal SH 35 for determining lighting-up and extinguishing points of time of the light emitting elements included in the light source 110 is also shown in FIG. 3. It may be easily known by those of ordinary skill in the art that the sync signal SH 35 may be continuously generated at intervals of the first time 34.

Referring back to FIG. 1, the light emitting time control unit 121 controls the light emitting times of the light emitting elements such that the light emitting elements are sequentially lit up and extinguished at least two times, respectively, during the scanning of an image of one of the plurality of lines of the document.

For example, when an image of a line of the document is scanned, the first light emitting element, the second light emitting element, and the third light emitting element are sequentially lit up and then extinguished, after which the first light emitting element, the second light emitting element, and the third light emitting element may be sequentially lit up and then extinguished once again. The order of sequential lighting-up and extinguishing is not limited to the above example, and may be implemented in various ways according to user settings.

Figure 4:
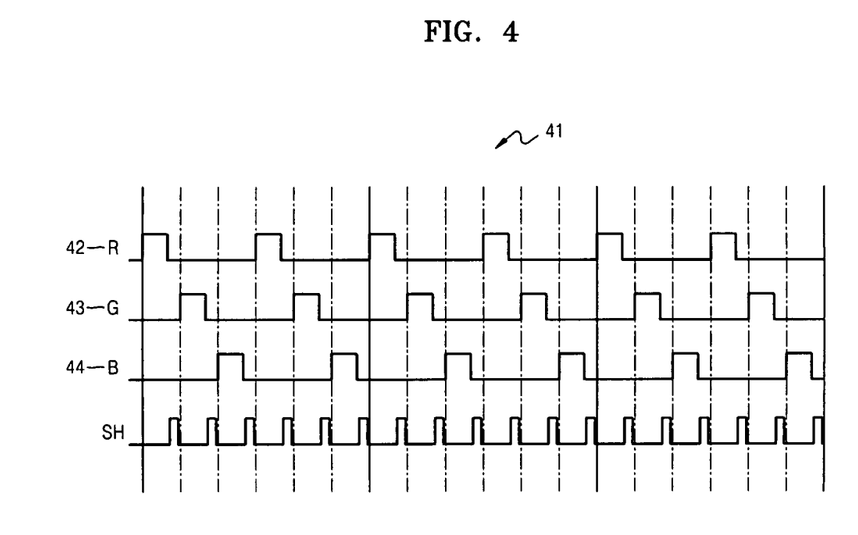
FIG. 4 is a timing diagram showing that light emitting elements emit light at least two times, according to an embodiment.

FIG. 4 is a timing diagram showing that the light emitting elements emit light at least twice, according to an embodiment. Shown in FIG. 4 is a timing diagram 41 showing lighting-up and extinguishing points of time of three light emitting elements for N=2 in Equation 2. It can be seen from the timing diagram 41 that R 42 indicating the first light emitting element, G 43 indicating the second light emitting element, and B 44 indicating the third light emitting element are lit up and extinguished twice, respectively.

In this way, the light emitting time control unit 121 performs a control operation such that the light emitting elements emit light at least twice, thereby improving the quality of a scanned image.

Referring back to FIG. 1, the light emitting time control unit 121 may control the lighting-up and extinguishing points of time of the light emitting elements of the light source 110, thus preventing a registration error. That is, in the image scanning apparatus 100, the sensor array 130 moves in a sub-scan direction at a predetermined speed to scan an image of document. Thus, when an image of the same line is scanned, irradiation positions of light irradiated from the plurality of light emitting elements included in the light source 110 are different from one another, thereby preventing a color registration error. Therefore, the image scanning apparatus 100 according to an embodiment can prevent the registration error.

In other words, in the image scanning apparatus 100, the light emitting elements of the light source 110 are sequentially lit up at intervals of the first time which is shorter than the second time under the control of the light emitting time control unit 121, and thus intervals between sub-scan direction image scan positions of colors corresponding to the light emitting elements are reduced. As a result, it is possible to prevent a phenomenon whereby in an image represented by scan data scanned by the image scanning apparatus 100, an upper portion has a reddish color, a lower portion has a bluish color, or an image defect is generated due to a color blur or a color registration error.

Referring back to FIG. 1, the light intensity control unit 122 controls the intensity of light irradiated from the light emitting elements included in the light source 110 such that the intensity of light irradiated from the light emitting elements is increased based on a predetermined value. The predetermined value may be a ratio of the second time to the first time controlled by the light emitting time control unit 121.

In other words, the light intensity control unit 122 performs a control operation such that the intensity of light irradiated from the light emitting elements included in the light source 110 is increased according to a predetermined value relative to a reference light intensity. The reference light intensity is the intensity of light irradiated from the light emitting elements when the light emitting elements are sequentially lit up at intervals of the second time.

For example, if the light emitting time control unit 121 controls the first time to be 1/N times the second time, the light intensity control unit 122 performs a control operation such that the intensity of light irradiated from the light emitting elements is greater than the reference light intensity or increased by N times the reference light intensity.

When using pulse width modulation (PWM) to control light intensity, the light intensity control unit 122 may increase a current applied to each of the light emitting elements. More specifically, if the light emitting time control unit 121 controls the first time to be 1/N times the second time, the light intensity control unit 122 performs a control operation such that a current applied to each of the light emitting elements is increased by N times a reference current. The reference current is a current applied to each of the light emitting elements when the light emitting elements are sequentially lit up at intervals of the second time.

If a size of the current increased by N times the reference current is greater than a size of a maximum current that can be applied to the light emitting elements, the light intensity control unit 122 applies the maximum current to the light emitting elements, thereby preventing the light source 110 from being damaged by an over-current applied thereto.

Figure 5:
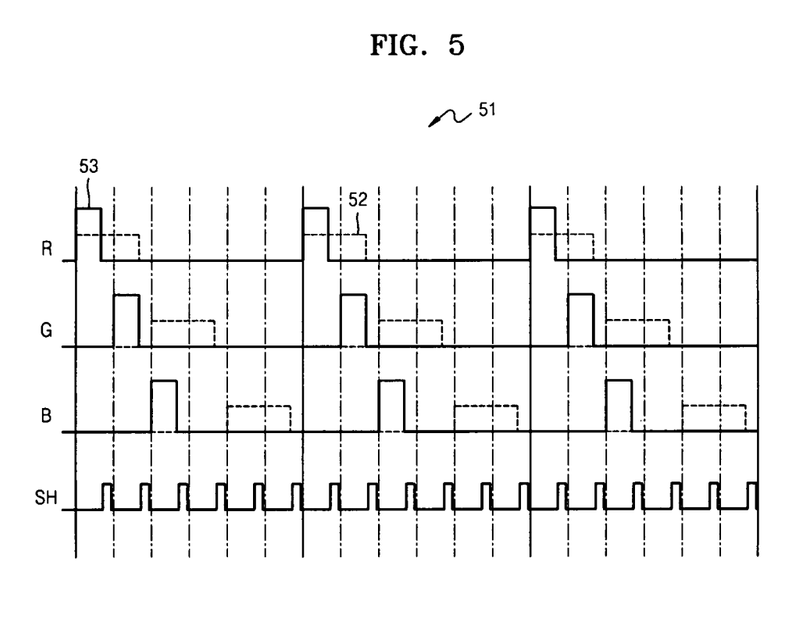
FIG. 5 is a timing diagram showing that current applied to light emitting elements is increased, according to an embodiment.

FIG. 5 is a timing diagram showing that current applied to light emitting elements is increased, according to an embodiment. Referring to FIG. 5, a timing diagram 51 shows a signal 52 for sequentially lighting up the light emitting elements included in the light source 110 at intervals of a second time and a signal 53 for sequentially lighting up the light emitting elements at intervals of a first time. The second time is the value obtained by dividing, by 3, a predetermined time required for scanning an image of a line. The first time is shorter than the second time by a predetermined value.

If the first time is ½ the second time in the timing diagram 51, the light intensity control unit 122 controls a current applied to each of the light emitting elements included in the light source 110 to be increased by 2 times the reference current. The reference current is a current applied to each of the light emitting elements included in the light source 110 when the light emitting elements are sequentially lit up at intervals of the second time. That is, the reference current denotes a current applied according to the signal 52.

Referring back to FIG. 1, as the light emitting time control unit 121 reduces time intervals at which the light emitting elements included in the light source 110 are sequentially lit up, an output value of the sensor array 130 may decrease, thus degrading the quality of an image represented by scan data. Hence, the light intensity control unit 122 increases the intensity of light irradiated from the light source 110, thereby preventing such image quality degradation.

The sensor array 130 transforms an image formed by reflected light from document, which originates from light irradiated from the light source 110 onto the document, into an electrical signal according to results of controlling the light emitting time and light intensity of the light source 110. That is, the sensor array 130 photoelectric-transforms light energy of the image formed by the light reflected from the document into electric energy such as current or voltage. In an embodiment, the sensor array 130 may be integrated into a CIS module, a structure of which will be described later in detail.

The output unit 140 outputs image data corresponding to an electric signal transformed by the sensor array 130. The output image data may be formed as color image data by combining reflected light of light irradiated from each of the plurality of light emitting elements included in the light source 110. The image data being output from the output unit 140 may be displayed on a user interface unit (not shown)

provided in the image scanning apparatus 100, or may be transmitted to an external device connected to the image scanning apparatus 100 through the output unit 140.

Therefore, by controlling the light emitting time and light intensity of the light source 110 according to an embodiment, the color registration error of the image scanned by the image scanning apparatus 100 may be prevented, thereby improving the quality of the scanned image.

Figure 6:
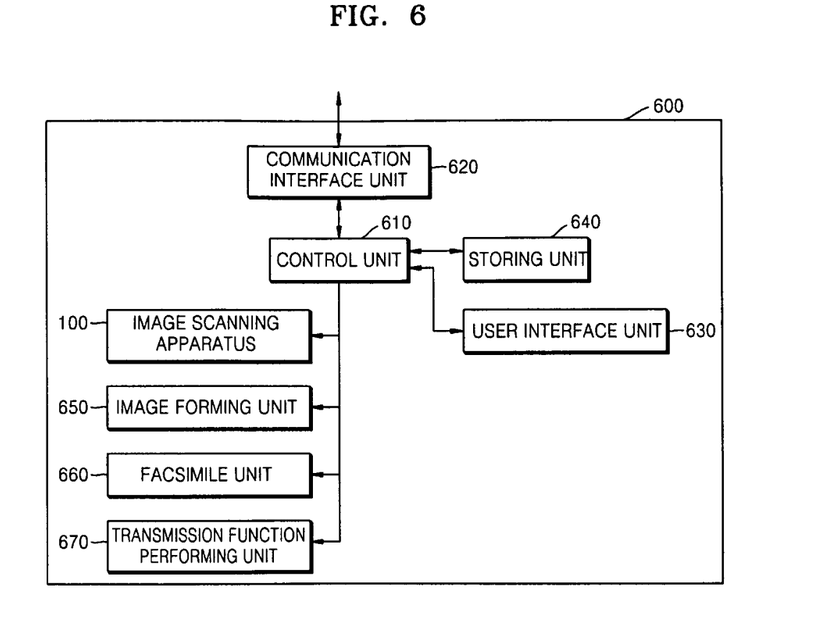
FIG. 6 is a block diagram of an image forming apparatus according to an embodiment.

FIG. 6 is a block diagram of an image forming apparatus 600 according to an embodiment. Referring to FIG. 6, the image forming apparatus 600 includes a control unit 610, a communication interface unit 620, a user interface unit 630, a storing unit 640, an image forming unit 650, a facsimile unit 660, a transmission function performing unit 670, and the image scanning apparatus 100.

The control unit 610 controls the overall operation of the image forming apparatus 600. The communication interface unit 620 transmits and receives data to/from an external device over a network. In an embodiment, the communication interface unit 620 may include a module used in facsimile transmission/reception, a network module for connection to a network, and a universal serial bus (USB) host module for forming a data transfer channel with a removable storing medium, depending on functions of the image forming apparatus 600. The external device is connected with the image forming apparatus 600 over a wired or wireless network, and may be a facsimile, a computer system, a mobile phone, a personal digital assistant (PDA), or a server.

The user interface unit 630 obtains an input signal from a user and displays information to the user. For example, the user interface unit 630 may include input/output devices provided in the image forming apparatus 600, such as a display panel, a mouse, a keyboard, a touch screen, a monitor, and a speaker.

The storing unit 640 stores data, print data, and scan data generated during operation of the image forming apparatus 600. The image forming unit 650 performs a print operation on document. The facsimile unit 660 facsimile-transmits the document. The transmission function performing unit 670 transmits the document to the external device such as a server, a removable recording medium, or a computer system.

The image scanning apparatus 100 generates image data of the document which is the scan target 150. The image data generated by the image scanning apparatus 100 may be stored in the storing unit 640 as scan data, may be displayed through the user interface unit 630, or may be transmitted to an external device through the communication interface unit 620. The image data generated by the image scanning apparatus 100 may be converted into print data by the image forming unit 650 to be printed on a print sheet, may be converted into facsimile data by the facsimile unit 660 to be facsimile-transmitted, or may be converted into transmission data by the transmission function performing unit 670 to be transmitted to an external device.

Figure 7:
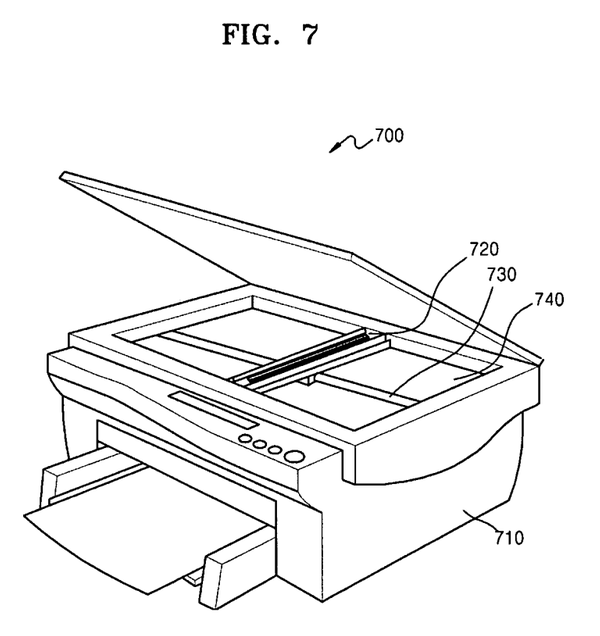
FIG. 7 is a perspective view of an image scanning apparatus according to an embodiment.

FIG. 7 is a perspective view 700 of the image scanning apparatus 100 according to an embodiment. The image scanning apparatus 100 is provided with a CIS module 720 on an upper portion of a body 710. The CIS module 720 scans document placed on glass 740 while reciprocating along a guide member 730, thus generating image data.

Figure 8:
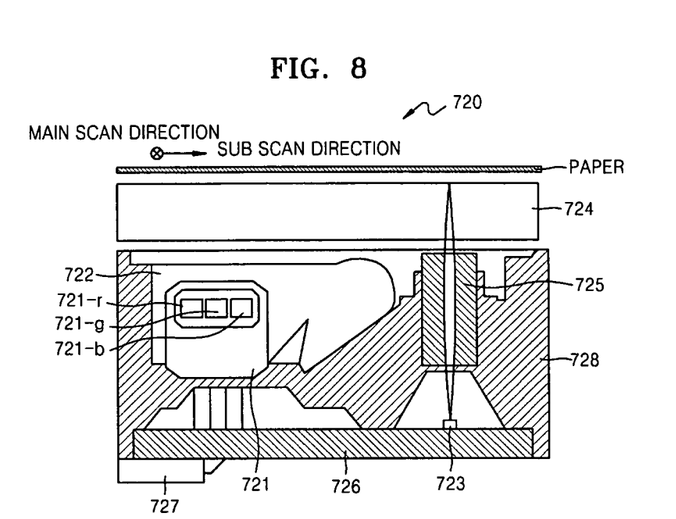
FIG. 8 illustrates in detail a contact image sensor (CIS) module, according to an embodiment.

FIG. 8 illustrates in more detail the CIS module 720 according to an embodiment. Referring to FIG. 8, the CIS module 720 includes a light source 721 having at least two light emitting elements, a light guide object 722 which illuminates document with light irradiated from the light source 721 in the width direction of the document, and a sensor array 723 which detects reflected light from the document. It would be easily understood by those of ordinary skill in the art that the light source 721 and a sensor array 723 shown in FIG. 8 may correspond to the light source 110 and the sensor array 130 shown in FIG. 1.

The light source 721 may include light emitting elements 721-r, 721-g, and 721-b of the three primary colors (RGB) having different light emitting wavelengths. Light emitted from the light source 721 is incident into the light guide object 722 arranged in the width direction of the document and is guided in a vertical direction of FIG. 8 (a main scan direction), thus being emitted from a light emitting unit installed on the light guide object 722 as a pencil of light rays. Consequently, the document placed on the glass 724 may be uniformly illuminated in the main scan direction, which is the document width direction. The light reflected from the document, which originates from light irradiated from the light source 721, is condensed by a lens array 725 on the sensor array 723 mounted on a substrate 726. The sensor array 723 generates an electric signal corresponding to an image formed by the lens array 725, and the generated electric signal is output through a connector 727. A frame 728 holds the light guide object 722, the lens array 725, and the substrate 726 in place.

Figure 9:
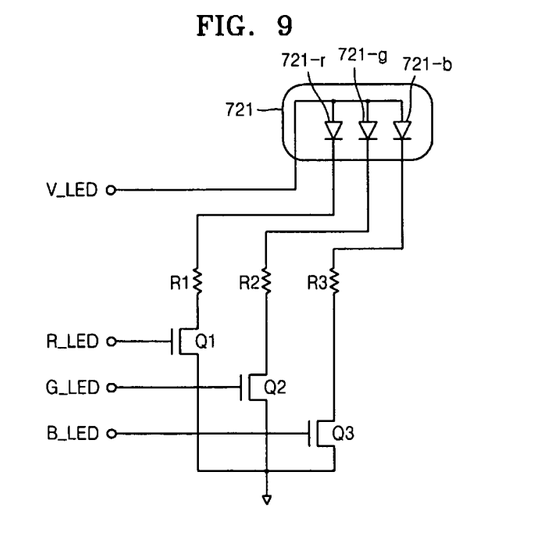
FIG. 9 is a circuit diagram of a circuit which controls a light source, according to an embodiment.

FIG. 9 is a circuit diagram of a circuit which controls the light source 721 according to an embodiment. Referring to FIG. 9, the light emitting elements 721-r, 721-g, and 721-b included in the light source 721 are light emitting diodes (LEDs) which emit RGB light by using a common anode. Switching elements Q1, Q2, and Q3 are connected to cathodes of the LEDs, respectively. Thus, the lighting-up of the LEDs may be separately controlled by drive signals R_LED, G_LED, B_LED controlled by the light emitting time control unit 121, and current applied to each of the LEDs may be controlled by a power signal V_LED controlled by the light intensity control unit 122.

Figure 10:
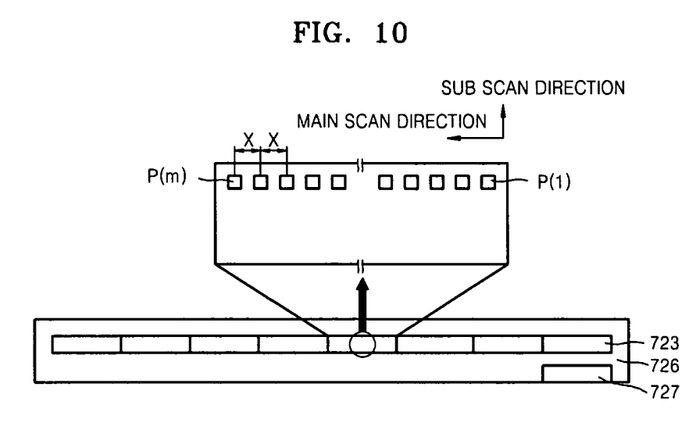
FIG. 10 illustrates an exterior of a sensor array of a CIS module of an image scanning apparatus, according to an embodiment.

FIG. 10 illustrates the exterior of the sensor array 723 of the CIS module 720 of the image scanning apparatus 100 according to an embodiment. Referring to FIG. 10, an arrangement of a single sensor integrated circuit (IC) forming the sensor array 723 is shown enlarged. The sensor array 723 includes a multi-chip in which a plurality of sensor ICs, each of which performs photoelectric transformation, are arranged in a straight line in the main scan direction. In each sensor IC, m pixels P(1)-P(m) for performing photoelectric transformation are arranged at predetermined intervals of x in a straight line in the main scan direction. For example, in the case of a sensor IC having a resolution of about 600 dpi, x may be equal to 42 μm (x=42 μm).

Therefore, by using the color CIS module 720 employing the relatively low price single channel sensor array 723, the image scanning apparatus 100 according to an embodiment may output an image, the quality of which is equivalent to that implementable when using a scan module having a color filter for each channel, thereby reducing manufacturing cost.

Figure 11:
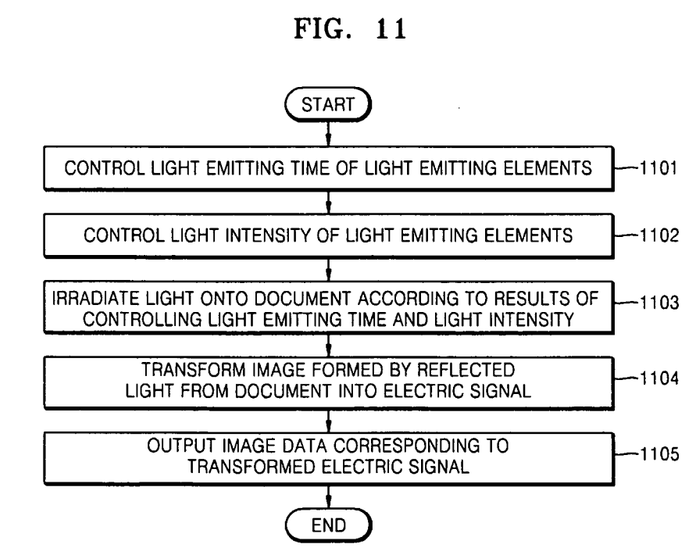
FIG. 11 is a flowchart illustrating an image scanning method according to an embodiment.

FIG. 11 is a flowchart illustrating an image scanning method according to an embodiment. Referring to FIG. 11, the image scanning method includes operations which are time-serially performed by the image scanning apparatus 100 shown in FIG. 1. Although omitted in the below description, the description made of the image scanning apparatus 100 shown in FIG. 1 may be applied to a method of controlling a light source of the image scanning apparatus 100.

In operation 1101, to scan an image of any one of a purity of lines of document, the light emitting time control unit 121 performs a control operation such that light emitting elements included in the light source 110 are sequentially lit up at intervals of a first time. The first time is shorter than the second time by a predetermined value, and the second time is the value obtained by dividing a predetermined time that is required for scanning the image of the line by the number of light emitting elements irradiating light onto the document.

In operation 1102, the light intensity control unit 122 performs a control operation such that the intensity of light irradiated from the light emitting elements included in the light source 110 is increased according to the predetermined value. That is, the light intensity control unit 122 may control the light intensity to be increased by a ratio of the second time to the first time.

In operation 1103, the light source 110 irradiates light onto the document according to results of controlling the light emitting time and the light intensity.

In operation 1104, the sensor array 130 transforms an image formed by light reflected from the document into an electric signal. In operation 1105, the output unit 140 outputs image data corresponding to the transformed electric signal.

It would be understood by those of ordinary skill in the art that in the flowchart shown in FIG. 11, operations 1103 and 1104 may be repeated until an image of a page of the document is entirely scanned.

Therefore, the image scanning apparatus 100 may reduce a color registration error in an image by controlling the light emitting time and light intensity of the light source 110, thereby enhancing the quality of a scanned image.

As is apparent from the foregoing description of one or more embodiments, a color registration error of an image scanned by the image scanning apparatus 100 can be prevented, thus improving the quality of the scanned image. Moreover, the image forming apparatus enhances printing quality by performing a print operation using quality-improved image data.

One or more embodiments may be embodied as a program of instructions that can be executed on computers, and may be implemented on general-purpose digital computers executing the program using a non-transitory recording medium. In addition, a data structure used in one or more embodiments may be recorded on a non-transitory computer-readable recording medium. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image scanning apparatus which scans an image of a document, the image scanning apparatus comprising:
   a light source including at least three light emitting elements of red, green, and blue, which are sequentially lit up at intervals of a first time;
   a light emitting time control unit to control a light emitting time of the at least three light emitting elements such that the first time is shorter than a second time by a predetermined value, the second time being a value obtained by dividing, by 3, a predetermined time that is required to scan an image of a line of the document;
   a light intensity control unit to control a light intensity of the at least three light emitting elements such that an intensity of light irradiated from the at least three light emitting elements is increased according to the predetermined value;
   a sensor array to transform an image formed by light reflected from the document into an electric signal according to results of control of the light emitting time and the light intensity; and
   an output unit to output image data corresponding to the electric signal.

2. The image scanning apparatus of claim 1, wherein the light emitting time control unit controls the first time to be 1/N times the second time, N is greater than 1, and the first time represents a time period from a lighting-up point of time of a first light emitting element among the at least three light emitting elements to a lighting-up point of time of a second light emitting element among the remaining light emitting elements after extinguishing of the first light emitting element.

3. The image scanning apparatus of claim 1, wherein the light emitting time control unit controls the light emitting time of the at least three light emitting elements by using a sync signal which determines lighting-up and extinguishing points of time of the at least three light emitting elements, and the sync signal is generated at intervals of a time that is 1/N times the second time, N being greater than 1.

4. The image scanning apparatus of claim 1, wherein the light emitting time control unit controls the light emitting time of the at least three light emitting elements such that the at least three light emitting elements are sequentially lit up and extinguished at least twice during the scanning of the image of the line.

5. The image scanning apparatus of claim 1, wherein the light intensity control unit controls the intensity of light irradiated from the at least three light emitting elements to be increased according to the predetermined value relative to a reference light intensity, and the reference light intensity is an intensity of light irradiated from the at least three light emitting elements when the at least three light emitting elements are sequentially lit up at intervals of the second time.

6. The image scanning apparatus of claim 1, wherein the light emitting time control unit controls the first time to be 1/N times the second time, and the light intensity control unit controls a current applied to each of the at least three light emitting elements to be increased by N times a reference current, in which N is greater than 1 and the reference current is a current applied to each of the at least three light emitting elements when the at least three light emitting elements are sequentially lit up at intervals of the second time.

7. The image scanning apparatus of claim 6, wherein if a size of the current increased by the N times is greater than a size of a maximum current that is applicable to the at least three light emitting elements, the light intensity control unit applies the maximum current to the at least three light emitting elements.

8. An image forming apparatus comprising:
an image scanning apparatus which controls a light emitting time of a plurality of light emitting elements such that the plurality of light emitting elements are sequentially lit up at intervals of a first time which is shorter by a predetermined value than a second time being a value obtained by dividing, by 3, a predetermined time that is required for scanning an image of any one of a plurality of lines of document, which controls an intensity of light irradiated from the plurality of light emitting elements such that the intensity of light irradiated from the plurality of light emitting elements is increased according to the predetermined value, which irradiates light onto the document by sequentially lighting up the plurality of light emitting elements at intervals of the first time according to results of controlling the light emitting time and the light intensity, which transforms an image formed by reflected light from the document, and which outputs image data corresponding to the electric signal; and
an image forming unit which prints print data corresponding to the image data output from the image scanning apparatus onto a print sheet.

9. The image forming apparatus of claim 8, further comprising a facsimile unit which transmits facsimile data corresponding to the image data which is output from the image scanning apparatus.

10. The image forming apparatus of claim 8, further comprising a transmission function performing unit which transmits transmission data corresponding to the image data output form the image scanning apparatus to an external device.

11. An image scanning method which scans an image of document, the image scanning method comprising:
controlling a light emitting time of a plurality of light emitting elements such that the plurality of light emitting elements are sequentially lit up at intervals of a first time which is shorter than a second time by a predetermined value, the second time being a value obtained by dividing, by 3, a predetermined time that is required for scanning an image of a line of the document;
controlling a light intensity of the plurality of light emitting elements such that an intensity of light irradiated from the plurality of light emitting elements is increased according to the predetermined value;
irradiating light onto the document by sequentially lighting up the plurality of light emitting elements at intervals of the first time according to results of controlling the light emitting time and the light intensity;
transforming an image formed by light reflected from the document into an electric signal; and
outputting image data corresponding to the electric signal.

12. The image scanning method of claim 11, wherein the controlling of the light emitting time comprises controlling the first time to be 1/N times the second time, in which N is greater than 1 and the first time represents a time period from a lighting-up point of time of a first light emitting element among the plurality of light emitting elements to a lighting-up point of time of a second light emitting element among the remaining light emitting elements after extinguishing of the first light emitting element.

13. The image scanning method of claim 11, wherein the controlling of the light emitting time comprises generating a sync signal which determines lighting-up and extinguishing points of time of the plurality of light emitting elements, in which the light emitting time of the plurality of light emitting elements is controlled by using the generated sync signal and the sync signal is generated at intervals of a time that is 1/N times the second time, N being greater than 1.

14. The image scanning method of claim 11, wherein the controlling of the light emitting time comprises controlling the light emitting time of the plurality of light emitting elements such that the plurality of light emitting elements are sequentially lit up and extinguished at least twice during the scanning of the image of the line.

15. The image scanning method of claim 11, wherein the controlling of the light intensity comprises controlling the intensity of light irradiated from the plurality of light emitting elements to be increased according to the predetermined value relative to a reference light intensity, in which the reference light intensity is an intensity of light irradiated from the plurality of light emitting elements when the plurality of light emitting elements are sequentially lit up at intervals of the second time.

16. The image scanning method of claim 11, wherein the controlling of the light emitting time comprises controlling the first time to be 1/N times the second time, and the controlling of the light intensity comprises controlling a current applied to each of the plurality of light emitting elements to be increased by N times a reference current, in which N is greater than 1 and the reference current is a current applied to each of the plurality of light emitting elements when the plurality of light emitting elements are sequentially lit up at intervals of the second time.

17. The image scanning method of claim 16, wherein the controlling of the light intensity comprises, if a size of the current increased by the N times is greater than a size of a maximum current that is applicable to the plurality of light emitting elements, applying the maximum current to the plurality of light emitting elements.

18. At least one non-transitory computer-readable recording medium storing instructions that when executed control at least one processor to perform an image scanning method, the method comprising:
controlling a light emitting time of a plurality of light emitting elements such that the plurality of light emitting elements are sequentially lit up at intervals of a first time which is shorter than a second time by a predetermined value, the second time being a value obtained by dividing, by 3, a predetermined time that is required for scanning an image of a line of a document;
controlling a light intensity of the plurality of light emitting elements such that an intensity of light irradiated from the plurality of light emitting elements is increased according to the predetermined value;
irradiating light onto the document by sequentially lighting up the plurality of light emitting elements at intervals of the first time according to results of controlling the light emitting time and the light intensity;
transforming an image formed by light reflected from the document into an electric signal; and
outputting image data corresponding to the electric signal.

* * * * *

UNITED STATES PATENT AND TRADEMARK OFFICE
CERTIFICATE OF CORRECTION

| | |
|---|---|
| PATENT NO. | : 8,687,229 B2 |
| APPLICATION NO. | : 12/926870 |
| DATED | : April 1, 2014 |
| INVENTOR(S) | : Kim |

It is certified that error appears in the above-identified patent and that said Letters Patent is hereby corrected as shown below:

In the Claims

Column 13, Line 34, in Claim 10, delete "form" and insert -- from --, therefor.

Signed and Sealed this
Twelfth Day of August, 2014

Michelle K. Lee
*Deputy Director of the United States Patent and Trademark Office*